(12) United States Patent
Oldani et al.

(10) Patent No.: US 7,399,391 B2
(45) Date of Patent: Jul. 15, 2008

(54) ELASTIC CURRENT COLLECTOR

(75) Inventors: Dario Oldani, Milan (IT); Manuela Manghi, Milan (IT)

(73) Assignee: UhDeNora Technologies, S.r.l., Milan (IT)

( * ) Notice: Subject to any disclaimer, the term of this patent is extended or adjusted under 35 U.S.C. 154(b) by 708 days.

(21) Appl. No.: 10/493,648

(22) PCT Filed: Dec. 3, 2002

(86) PCT No.: PCT/EP02/13677

§ 371 (c)(1),
(2), (4) Date: Apr. 22, 2004

(87) PCT Pub. No.: WO03/048422

PCT Pub. Date: Jun. 12, 2003

(65) Prior Publication Data

US 2004/0253519 A1    Dec. 16, 2004

(30) Foreign Application Priority Data

Dec. 3, 2001    (IT)    .......................... MI2001A2538

(51) Int. Cl.
C25C 3/16 (2006.01)
C25B 9/04 (2006.01)
(52) U.S. Cl. ...................................... 204/252; 204/282
(58) Field of Classification Search ................ 204/242, 204/252, 282, 283; 205/374; 29/2, 623.1–623.5, 29/730, 731
See application file for complete search history.

(56) References Cited

U.S. PATENT DOCUMENTS

| 4,343,690 A | * | 8/1982 | de Nora ....................... 204/263 |
| 4,654,136 A | * | 3/1987 | Dang et al. .................. 204/283 |
| 4,657,650 A | | 4/1987 | Vauss, Jr. et al. |
| 4,693,797 A | | 9/1987 | deNora |
| 5,599,430 A | | 2/1997 | Pimlott et al. |

FOREIGN PATENT DOCUMENTS

DE            43 25 705 A1    2/1995

* cited by examiner

*Primary Examiner*—Alexa D. Neckel
*Assistant Examiner*—Zulmariam Mendez
(74) *Attorney, Agent, or Firm*—Charles A. Muserlian

(57)    ABSTRACT

The invention describes a current collector for electrochemical cells, consisting of a sandwich of compressible and resilient layers of metal wires, which imparts a predetermined mechanical load under a broad compression range.

16 Claims, 4 Drawing Sheets

ELASTIC CURRENT COLLECTOR

This application is a 371 of PCT/EP02/13677 filed Dec. 3, 2002.

The invention concerns a new current collector for electrochemical cells, particularly useful for electrolytic cells, fuel cells or other types of cells separated into at least two compartments, wherein the separator is an ion exchange membrane or any other type of semi-permeable diaphragm characterised by a limited mechanical resistance.

The current collector of the invention is useful for ensuring the electrical continuity between two conductive surfaces separated by a gap, which in the case of an electrochemical cell is typically exploited for feeding reactants, discharging products, circulating electrolytes or for the thermo-regulation of fluids, or for a combination of two or more of these functions.

The advantages obtained by this type of contact inside an electrochemical cell, by means of deformable elastic elements, are well known to the experts of the art. Typical examples of deformable elastic collector are metal foams and reticulated porous materials in general, as described for example in U.S. Pat. No. 4,657,650. Another example, of larger industrial diffusion, is a sandwiched metal wire structure, as described for example in U.S. Pat. No. 4,693,797. Deformable structures of this type have the advantage of being capable of transmitting electric current between two conductive surfaces partially compensating for their deviations from planarity, thanks to the different local compression they may undergo. It is therefore advantageous resorting to the same both in terms of mechanical as well as electrical characteristics, to improve the efficiency of the cells where they are utilised. In particular, it is evident that the efficiency of removal/transmission of electric current increases as the contact pressure exerted by the collector onto the conductive surfaces increases. Further, said pressure must be preferably exerted making the collector work under an elastic regimen, to compensate for possible dimensional variations due to expansions, vibrations or other phenomena which may vary the geometry of the system in a microscopic range. The pressure exerted by the collector however should not exceed, in many practical applications, a limit threshold to avoid mechanical damages. For example, it is known that in electrochemical cells where one or more compartments use a semi-permeable diaphragm, for example an ion exchange membrane, said separation elements have a very limited mechanical resistance and resist to mechanical loads only below a certain threshold. The problem of mechanical resistance however does not affect only the separators, as it is known that electrochemical cells can be provided with deformable electrodes, for example very thin metal meshes, or gas diffusion electrodes comprising carbon materials with limited resilience, such as carbon paper or carbon cloth, which have a scarcely reliable behaviour with loads exceeding for example 0.35-0.4 kg/cm$^2$.

The mattress described in U.S. Pat. No. 4,693,797 has found a remarkable industrial application in view of the fact that, if used under optimum conditions, it grants a suitable contact pressure (indicatively 0.2-0.35 kg/cm$^2$) also when using ion exchange membranes or gas diffusion electrodes or both said components. The contact load exerted by this type of collector is maintained by the deformation caused by the squeezing when clamping the cell; that is the mattress is inserted in an uncompressed condition, thus with the maximum expansion, and then squeezed when clamping the cell, whereby its thickness is decreased even by 50%. For example, a mattress with a thickness of 10 mm when uncompressed, may reach, under operation, a thickness of 4 or 5 millimeters. In the case of the mattress of U.S. Pat. No. 4,693,797, this is a very critical factor, as the load curve under that compression regimen is very sharp. That is, a slight error in the mechanical tolerances is sufficient to impose to the mattress either a too small load, insufficient to grant a good electrical contact, or too heavy load. In particular, if the sandwich of wires constituting the mattress is compressed until the wire bundles are totally collapsed, a further compression, even if slight, involves a very heavy mechanical load, which in many cases may even be localised into a very small region, wherein a possible mechanical deformation of the surfaces to be contacted may occur. In the case of a cell with elements not suitable for bearing heavy mechanical loads, such a membranes or gas diffusion electrodes, this may readily bring to a mechanical failure of these critical components. In addition to the primary cost of said components, also the costs connected to the shutdown of the cell for repairing and relevant substitutions must be considered.

In this regard, a further inconvenience typical of the mattress of U.S. Pat. No. 4,693,797 is the positioning of the same in the cell, due to the fact that its periphery is deformable and thus its alignment with the other components of the cells as well as centering any gasket may become a critical operation, to be carried out in any case manually. Cells equipped with this type of collector involve therefore additional assembling and maintenance costs, as automated assembling would be undoubtedly risky.

It is an object of the present invention to provide for a current collector for use in electrochemical cells capable of overcoming the prior art drawbacks.

In particular, it is an object of the present invention to provide a current collector capable of impressing a suitable load for use in electrochemical cells, for example in cells provided with separators such as diaphragms and membranes and/or gas diffusion electrodes, under a broad compression range. Under another aspect, it is an object of the present invention to provide a current collector for electrochemical cells which preferably permits an automated assembling.

Under another aspect, it is an object of the present invention to provide an electrochemical cell, for example an electrolytic cell or a fuel cell equipped with a current collector overcoming the inconveniences of the prior art.

The invention consists of a current collector obtained by sandwiching compressible and resilient layers, each one formed by an arrangement of metal wires. The main characteristic of the current collector is its capability of imparting a suitable load for applications in electrochemical cells, indicatively comprised between 0.15 and 0.40 kg/cm$^2$, in a wide range of compressions, equal to at least 10% of the uncompressed thickness of the collector itself. In a preferred embodiment, said range is comprised between 20 and 60% of the compression of the collector with respect to its uncompressed state. This means that, for example, a typical collector having a thickness, before compression, of 10 millimeters, may be compressed upon clamping of the cell with tolerances up to about more or less 1 millimeter without risking ruptures of delicate components or insufficient contact, which result cannot be obtained with the collectors of the prior art. Preferably, for a collector 10 mm thick in the uncompressed state, the ideal operation thickness is comprised between 3 and 6 millimeters. The collector of the invention is preferably made by sandwiches of metal wires having a diameter indicatively comprised between 0.1 and 0.35 millimeters; the thickness of the collector resulting from said sandwich is preferably comprised between 5 and 15 millimeters. The preferred materials for producing the collector of the invention are all the metallic materials, in particular valve metals, for example titanium and alloys thereof, for the anodic collector, and nickel or alloys thereof for the cathodic collectors. Depending on the applications, the collector of the invention my also be a bipolar collector, for example provided with nickel layers facing the cathodic surface and titanium or other valve metal layers facing the anodic surface. Depending on the process conditions, it is possible to further coat the collector with materials providing protection against corrosion, for example the cathodic collectors with a silver coating and the anodic collectors with a coating of noble metals or alloys thereof or their oxides. Different embodiments are possible for the collector of the invention, however, it is preferable that the most external layer be generally planar in order to distribute the contact as uniformly as possible onto the surface to be contacted, which may be, in the case of electrochemical cells, metal surfaces (for examples electrodes or metal partition sheets) but also surfaces provided with a remarkably lower planar conductivity, (for example gas diffusion electrodes made of carbon material). The planar layers of interwoven wires are affected by the inconvenient, typical of the prior art, of a non sufficient deformability to grant an adequate compression load for a sufficiently broad compression range. It is therefore preferable that the collector comprise internal layers of wires having a permanent undulation according to a geometry easily achieved through automatic working of the product. The best way to put the invention into practice is providing at least two of these internal layers, sandwiched in order to have the more offset positioning of the undulation direction, for example the direction of the undulations of adjacent layers may be about 90°. In this way, it is possible to obtain that the internal undulated layer do not penetrate into each other and this gives to the whole structure compression characteristics which are much more regular and gradual in terms of applied load with respect to the compression thickness. In a further preferred embodiment, the various layers of the collectors are held together by a rigid perimetral frame which presents the further advantage of providing the object with a non deformable geometry with respect to the plane. In this way, the collector may be easily applied into the complex arrangements made of several cells, for example in conventional electrolysers or fuel cell stacks, made of filter-press arrangements of elementary cells, even when an automated assembling system is foreseen to reduce considerably the production and maintenance costs. The above illustrated structure further offers the non negligible advantage of being open to the flow of fluids with respect to traditional mats, which concurs to a better reliability and operation efficiency of electrochemical processes carried out in the cells in which it is applied.

Figure 1:
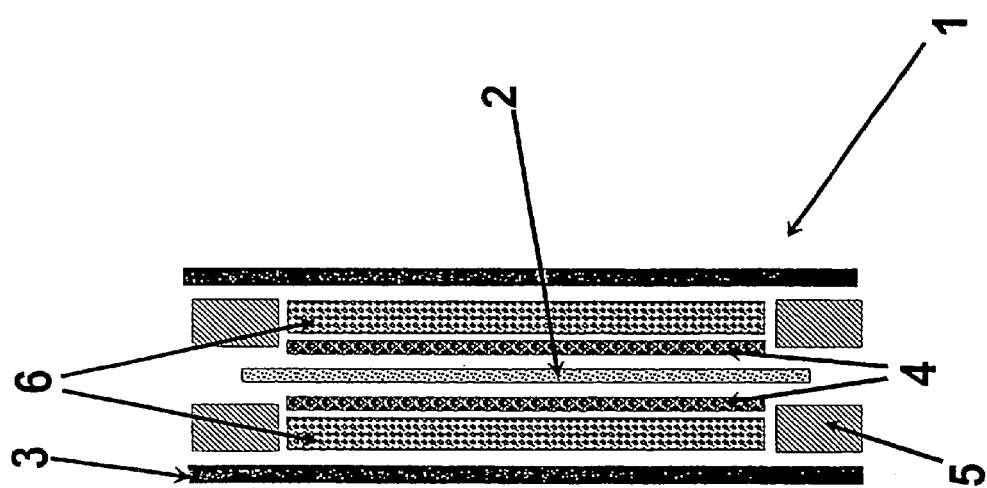
FIG. 1 shows an electrochemical cells containing the collector of the invention.

FIG. 1 shows a generic electrochemical cell (1) divided by a membrane or diaphragm (2) and delimited by two conductive plates (3); the cell may generically be an electrolysis cell or a fuel cell or other type of electrochemical reactor. The electrodes whereon the anodic and cathodic reactions take place are indicated by (4). The electrodes (4) may be any type of electrode generically known for electrochemical applications, for example metal sheets optionally activated by electrocatalytic coatings, gas diffusion electrodes obtained on porous surfaces such as carbon cloth or graphite, sinterized metals, etc. For example sake the perimetral gaskets (5) are also illustrated, but as it will be obvious for an expert of the art, other hydraulic sealing systems are likewise possible. For the types of electrodes described and for other commonly used electrodes, it is not convenient to obtain the electrical contact directly on the conductive plates (3). In fact this would require a too high and unpractical thickness as in many cases the porosity would be insufficient and, more importantly, the structures are substantially rigid and would require too high clamping pressures to obtain a good electrical contact, risking to damage irreversibly the membrane (2). The electric contact transmission between the plate (3) and the adjacent electrode (4) is therefore preferably effected by a compressible resilient material, preferably operating in an elastic mode. This material, in the case of FIG. 1, is the current collector (6) of the invention. However, it is evident to the expert in the art that this is only one of the different possibilities for using the collector of the invention in an electrochemical cell and the same could be advantageously used for example for contacting two metal plates belonging to two adjacent cells in a monopolar or bipolar filter-press electrolyser, or other similarly obvious applications.

Figure 2:
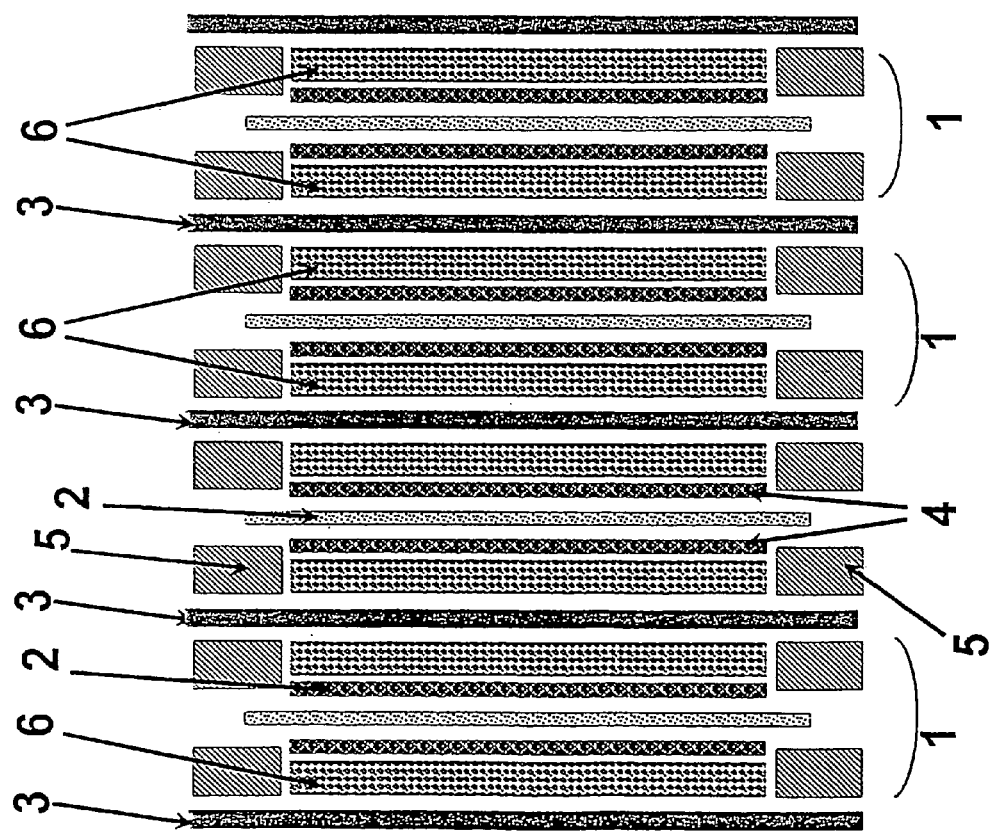
FIG. 2 shows a filter-press arrangement of electrochemical cells containing the collector of the invention.

FIG. 2 shows the collector of the invention used in similar cells as those of FIG. 1 in a filter-press arrangement, in the specific bipolar case. The deformability characteristics of the collector of the invention (6) and its adaptability to conform to the profile of the various metallic plates (3), for stacks which may reach even a hundred elementary cells (1), is particularly outstanding.

Figure 3:
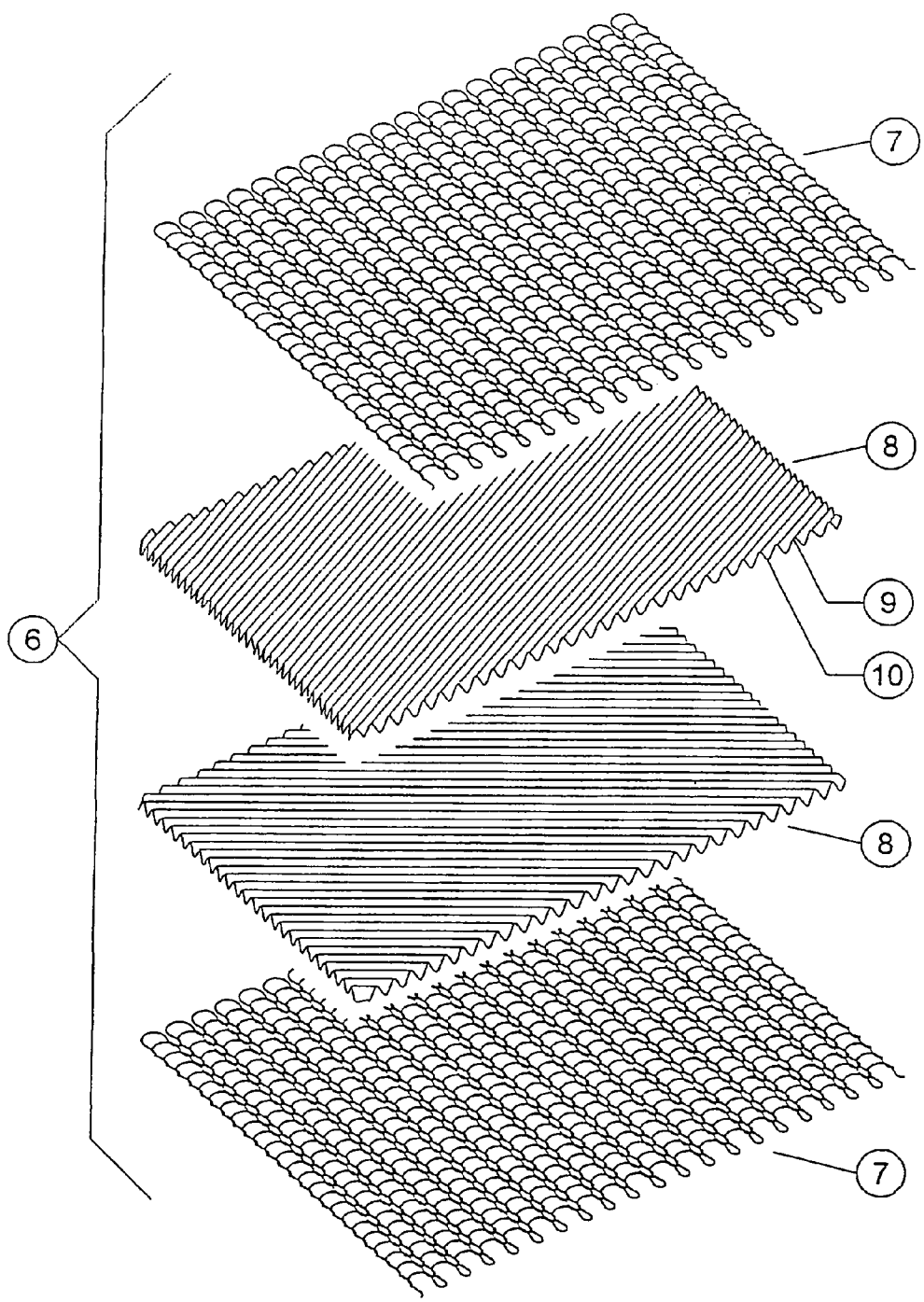
FIG. 3 shows a preferred embodiment of the collector of the invention.

FIG. 3 shows a preferred embodiment of the multi-layered current collector (6), according to the invention. In this case the reference numeral (7) indicates the two external layers, and (8) the two internal layers; it is quite evident how the current collector (6) may be produced also with a different number of internal layers. The external layers (7), obtained by interwoven metal wires, preferably with a diameter comprised between 0.1 and 0.35 millimeters, generally have a planar profile. The external layers (8) are substantially the same as the external ones, likewise made by interwoven metal wires (for simplicity sake not shown in detail in the figure), apart from the fact that they are undulated, by means of a very simple mechanical working, in order to form a regular arrangement of protrusions (9) and depressions (10), preferably regularly spaced apart. As will be seen in the figure, preferably the direction of one undulation should be off-set with respect to the underlying one; in the case of the two internal layers (8) of FIG. 3, the undulations are offset by 90°. In this manner, it is nearly completely avoided a reciprocal penetration of two internal layers (8). It has been found that arrangements of this type exhibit extremely gradual load curves as a function of the compression with respect to prior art current collectors, so that a surprisingly broad range is obtained, in terms of compression and thus of operating thickness, whereby the applied mechanical load is sufficient to permit a good electrical contact without damaging the delicate components of the cell.

Figure 4:
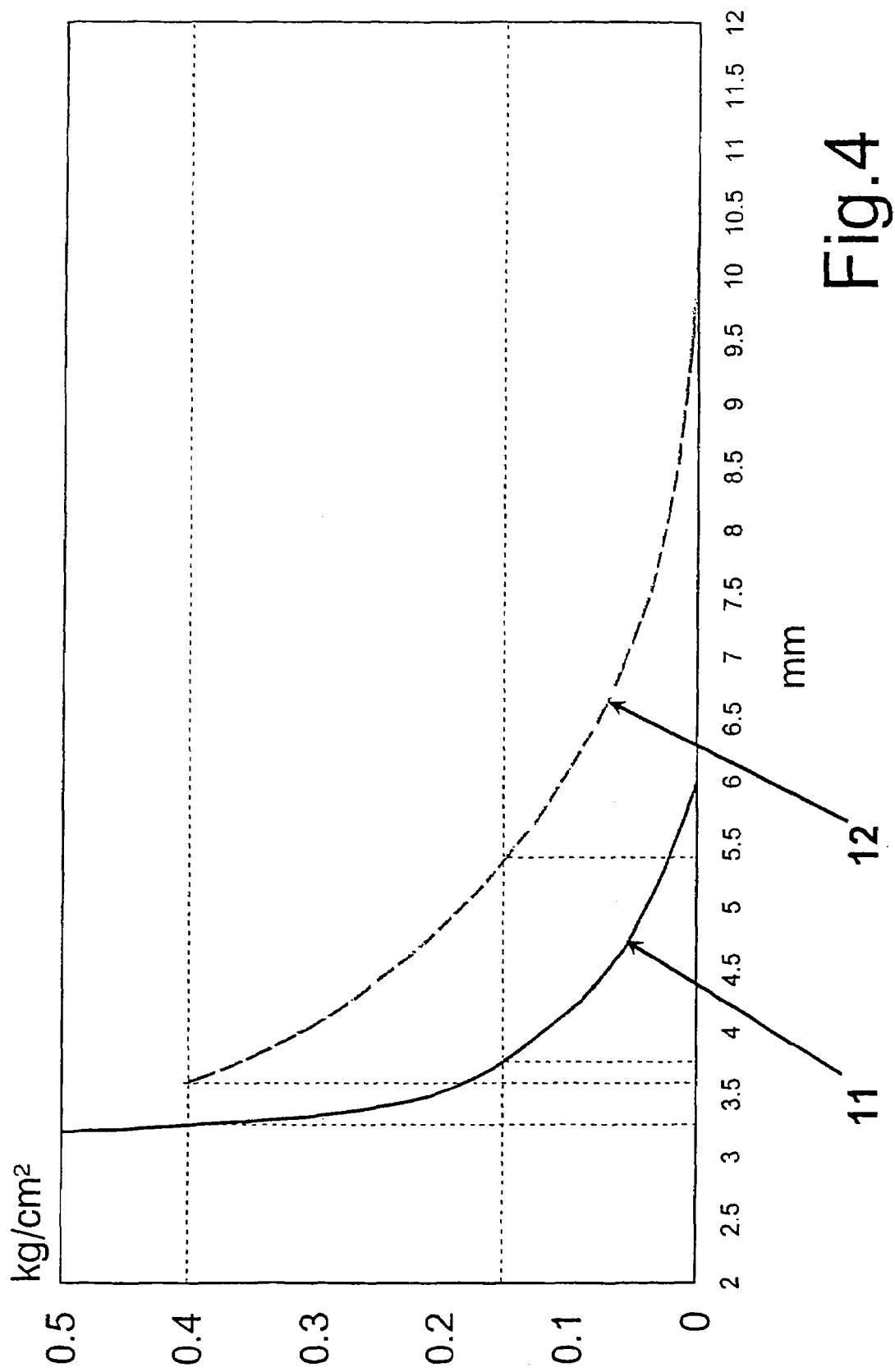
FIG. 4 shows the load curves relating to the collector of the invention compared to those of a prior art mattress.

FIG. 4 shows the load curve (12) of a nickel collector obtained by two external mono-layers (7) made of a wire with a diameter of 0.27 mm, not undulated, and two internal double layers (8) made of a wire with a diameter of 0.16 mm, undulated with a pitch of 8.6 mm, put on top one of the other in order to off-set the undulations by 90° and avoid reciprocal penetrations. The four layers have been inserted in a perimetral frame in the form of a casing, not shown in the figures. The overall uncompressed thickness was about 10 millimeters. It can be seen from curve (12) that the useful compressed thickness range in the elastic mode, that is when the resulting load is comprised between 0.15 and 0.40 kg/cm², varies between 3.6 and 5.4 millimeters, with a comprised between 46 and 64% with respect to the uncompressed thickness. It is a wide range, which easily complies with the tolerances of a conventional cell structure construction. The load curve (11) regards a mattress, 6 millimeters thick, made by the same nickel wire, according to the teachings of U.S. Pat. No. 4,693, 797: it is readily apparent that the useful operating range is extremely reduced, largely below 10% of the uncompressed thickness.

The invention claimed is:

1. A current collector comprising a sandwich of compressible and resilient layers consisting of metal wires, wherein said layers of metal wires comprise two external planar layers and at least two internal non-penetrated layers, said two internal layers being undulated along two distinct directions.

2. The collector of claim 1, wherein the said distinct directions are offset by about 90°.

3. The collector of claim 1 wherein it imparts a load between 0.15 and 0.40 kg/cm² in a compression range not lower than 10% of its uncompressed thickness.

4. The collector of claim 3, wherein the said compression range is between 20 and 60% of said uncompressed thickness.

5. The collector of claim 3, wherein the said wires have a diameter between 0.1 and 0.35 millimeters.

6. The collector of claim 1 wherein it has an uncompressed thickness between 5 and 15 millimeters.

7. The collector of claim 1 wherein it is made of a material selected from the group consisting of nickel, titanium and alloys thereof, optionally provided with a protective coating.

8. The collector of claim 7 wherein the said protective coating is silver or a noble metal.

9. The collector of claim 1 wherein it comprises a perimetral frame supporting said sandwich of compressible and resilient layers.

10. An electrochemical cell comprising at least one current collector of claim 1.

11. The cell of claim 10 wherein it is divided into at least two compartments by an ion exchange membrane or a diaphragm.

12. The cell of claim 11 selected from the group consisting of fuel cells, chlor-alkali electrolysis cells, hydrochloric acid electrolysis cells and neutral salt electrolysis cells.

13. The cell of claim 10 wherein said current collector is in direct contact with a gas diffusion electrode.

14. The cell of claim 11 wherein said two compartments are an anodic compartment and a cathodic compartment.

15. The cell of claim 14 wherein the said collector is made of pure titanium or alloys thereof, optionally provided with a protective coating of noble metals or their oxides thereof and said collector is placed in the anodic compartment.

16. The cell of claim 13 wherein the said collector is made of pure nickel or alloys thereof, optionally provided with a protective coating of silver and said collector is placed in the cathodic compartment.

* * * * *